US006395049B2

(12) United States Patent
Knödler et al.

(10) Patent No.: US 6,395,049 B2
(45) Date of Patent: May 28, 2002

(54) COMBINATION OF AN AIR FILTER AND A MEMBRANE CARBURETOR

(75) Inventors: Bernd Knödler, Winnenden; Andreas Bähner, Weinstadt, both of (DE)

(73) Assignee: Andreas Stihl AG & Co., Waiblingen (DE)

(*) Notice: Subject to any disclaimer, the term of this patent is extended or adjusted under 35 U.S.C. 154(b) by 0 days.

(21) Appl. No.: 09/741,864

(22) Filed: Dec. 22, 2000

(30) Foreign Application Priority Data

Dec. 24, 1999 (DE) .................................... 299 22 748 U

(51) Int. Cl.[7] .......................... B01D 35/30; F02B 77/00

(52) U.S. Cl. .......................... 55/385.3; 55/318; 55/497; 55/DIG. 28; 123/198 E

(58) Field of Search .......................... 55/318, 319, 337, 55/385.3, 502, 497, DIG. 28; 123/198 E; 261/DIG. 68

(56) References Cited

U.S. PATENT DOCUMENTS 5,438,965 A * 8/1995 Aronsson et al. ...... 55/DIG. 28
5,503,649 A * 4/1996 Nickel .................... 55/DIG. 28
5,526,777 A * 6/1996 Taomo et al. .......... 55/DIG. 28
5,706,777 A * 1/1998 Schlessmann .......... 55/DIG. 28
6,004,382 A * 12/1999 Pikesh et al. .............. 55/385.3
6,212,882 B1 * 4/2001 Greger et al. .............. 55/385.3
6,293,981 B1 * 9/2001 Holderle et al. ........... 55/385.3

FOREIGN PATENT DOCUMENTS

DE 2902348 8/1979

* cited by examiner

*Primary Examiner*—David A. Simmons
*Assistant Examiner*—Minh-Chau T. Pham
(74) *Attorney, Agent, or Firm*—Walter Ottesen

(57) ABSTRACT

The invention relates to the combination of an air filter and a membrane carburetor (1). The membrane carburetor (1) has an intake channel section (3) configured in the carburetor housing (2) into which the fuel-conducting channels (4, 4') open which are fed from a control chamber (5) of the carburetor housing (2). The control chamber (5) is separated by a control membrane (6) from the compensation chamber (7). A compensation channel (11) leads from the compensation chamber (7) into a flow space (9). A connecting piece (8) is led into the flow space (9) as a connection of the intake channel section (3) of the membrane carburetor (1) with the flow space (9). The compensation channel (11) and the connecting piece (8) open into the housing (21) on the clean air side (23). The housing (21) forms the flow space (9). The compensation channel (11) is guided into the housing (21) via a segment (10) in the connecting piece (8) to provide a simpler assembly and constructive configuration of the compensation connection. The opening (15) of the compensation channel (11) defines a first plane (17). The opening (16) of the connecting piece (8) defines a second plane (18). The planes (17, 18) are separated from each other and these planes preferably intersect.

17 Claims, 7 Drawing Sheets

COMBINATION OF AN AIR FILTER AND A MEMBRANE CARBURETOR

BACKGROUND OF THE INVENTION

An arrangement of an air filter and a carburetor is disclosed in German patent publication 2,902,348. The membrane carburetor includes an arrangement for compensating for pressure fluctuations of the ambient pressure on the fuel-filled control chamber of the carburetor. A compensation chamber is arranged on the dry rear side of the control membrane. The compensation chamber communicates with a compensation channel which branches from a flow compartment at atmospheric pressure. With this arrangement, a reliable operation of the engine is ensured. The combustion air flows through the intake channel section of the membrane carburetor into the combustion chamber of the engine. This combustion air mixes with fuel entering into the intake channel section from the control chamber. In this way, an underpressure develops in the control chamber whereby the control membrane is moved and a control valve is opened via which fuel flows into the control chamber. Fluctuations of the ambient pressure operate via the compensation chamber on the control membrane so that more or less fuel is metered in dependence upon ambient air pressure. An overmetering or undermetering of fuel into the intake channel of the membrane carburetor is thereby avoided. The known arrangement is large and is complex to assemble.

SUMMARY OF THE INVENTION

It is an object of the invention to configure the compensation of a membrane carburetor in a simple manner in an arrangement of air filter and membrane carburetor so that the degree of contamination of the air filter is considered while, at the same time, facilitating a simple manufacture and assembly. The air filter is connected ahead of the membrane carburetor.

The invention is for a combination of an air filter and a membrane carburetor. The combination includes: a carburetor housing defining an air intake channel through which a stream of air is drawn by suction; the carburetor housing further defining an interior space; a membrane partitioning the interior space into a control chamber for holding fuel and a compensation chamber; fuel-conducting channels extending from the control chamber and opening into the air intake channel for conducting fuel from the control chamber to the air intake channel for entrainment by the stream of air; an air filter housing defining a flow space; a connecting pipe connecting the flow space to the air intake channel for conducting the stream of air from the flow space to the air intake channel and the connecting pipe having an opening in the flow space where the stream of air enters the connecting pipe; a compensation channel for connecting the compensation chamber to the flow space; the compensation channel including a channel segment within a portion of the connecting pipe and the channel segment having an opening in the flow space; the connecting pipe having a wall and a part of the wall defining a wall of the compensation channel in the region of the channel segment; and, the openings of the connecting pipe and the channel segment of the compensation channel being disposed in the flow space in respectively different planes.

A simple assembly of the compensation unit is possible because of the configuration and arrangement of the compensation channel in the connecting piece between the intake channel section of the membrane carburetor and the flow space. The compensation channel opens into the housing, especially the air filter housing. This housing forms the flow space. Because of this constructive measure, a part of the wall of the connecting piece simultaneously forms a wall of the compensation channel. The housing, which forms the flow space, is purposefully partitioned by an air filter element. The respective openings of the connecting piece and the compensation channel lie on the clean air side of the flow space. The connecting piece extends through the air filter element together with the compensation channel guided therein. The air filter element and a filter carrier for accommodating the air filter element are thereby only penetrated at one location.

The plane defined by the opening of the compensation channel lies in a plane other than the plane defining the opening of the connecting piece itself. Preferably, the planes of both openings are arranged at different elevations or are perpendicular to each other. In this way, it is ensured that no dynamic pressure is present at the opening of the compensation channel. Instead, static pressure is present at this opening.

With increasing contamination of the air filter, the underpressure increases on the clean air side of the housing during operation of an internal combustion engine supplied by the membrane carburetor. In this way, the problem of an overenrichment of an air/fuel mixture is present. To counter this problem, the underpressure of the clean air side of the flow space or of the housing is present on the dry side of the control membrane via the compensation channel and operates in a compensating manner on the control membrane of the membrane carburetor. This leads to the situation that the air/fuel mixture remains substantially constant in the mixture ratio even when contaminants have accumulated on the air filter.

If the opening of the compensation channel is arranged in the flow space at a different topographical elevation to the opening of the connecting piece for the combustion air, the opening of the compensation channel can be placed in a peripheral region of the housing defining the flow space. In this way, it is ensured that only static pressure is present at the opening of the compensation channel.

It can be purposeful to configure the connecting piece and the compensation channel as one piece with the housing defining the flow space. To exchange an air filter element, the housing is partitioned into two housing parts in the plane in which the air filter element is mounted or is partitioned into two housing parts in a plane parallel thereto. The compensation channel and the connecting piece can preferably be configured as one piece with an interior element of the air filter housing and extend through the air filter at one location.

The interior element is, in plan, preferably circularly shaped with a cylindrical rim. The cylindrical rim is configured so as to have a U-shape when viewed in section and engages over a corresponding annular flange of a flow space in the air filter housing part which is connected to the output channel section of the membrane carburetor so as to permit flow. The base of the circularly-shaped interior element supports a cylindrically-shaped end section of the connecting piece. The end section projects the same distance to both sides. The end section of the compensation channel extends through the base of the interior element in the end section of the connecting piece and this end section of the compensation channel opens in a widening cone on its inner side in the region of the base. In the assembled condition of the interior element, the end section of the compensation channel sits with the cone on a conical connecting end of the compensation channel in the air filter housing. In this way, a tight separation between the compensation channel and the connecting piece is ensured.

The free end of the compensation channel on the support element is provided with a diaphragm arranged at the opening of the compensation channel. The diaphragm has a central, preferably circular, opening. The diaphragm is advantageously made of metal and can be seated in the opening of the compensation channel. Different diaphragms make possible the adaptation of the compensation device to different kinds of membrane carburetors. If the central opening is to be very accurate, the diaphragm is preferably made of metal, especially as a turned piece.

It is purposeful to provide flanges at the outer side of the air filter housing for connecting the compensation channel and the connecting piece. The seal of the sealing surfaces at the flanges is assumed by profile seals or roll rings made of elastic material.

At the opening of the connecting piece in the flow space, it is advantageous to fix a flow straightener, such as a lattice, for the purpose of attenuating the noise of the air sounds in the connecting piece. The flow straightener is advantageously so configured that it subdivides the clear cross section of the connecting piece into the intake channel and the compensation channel.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
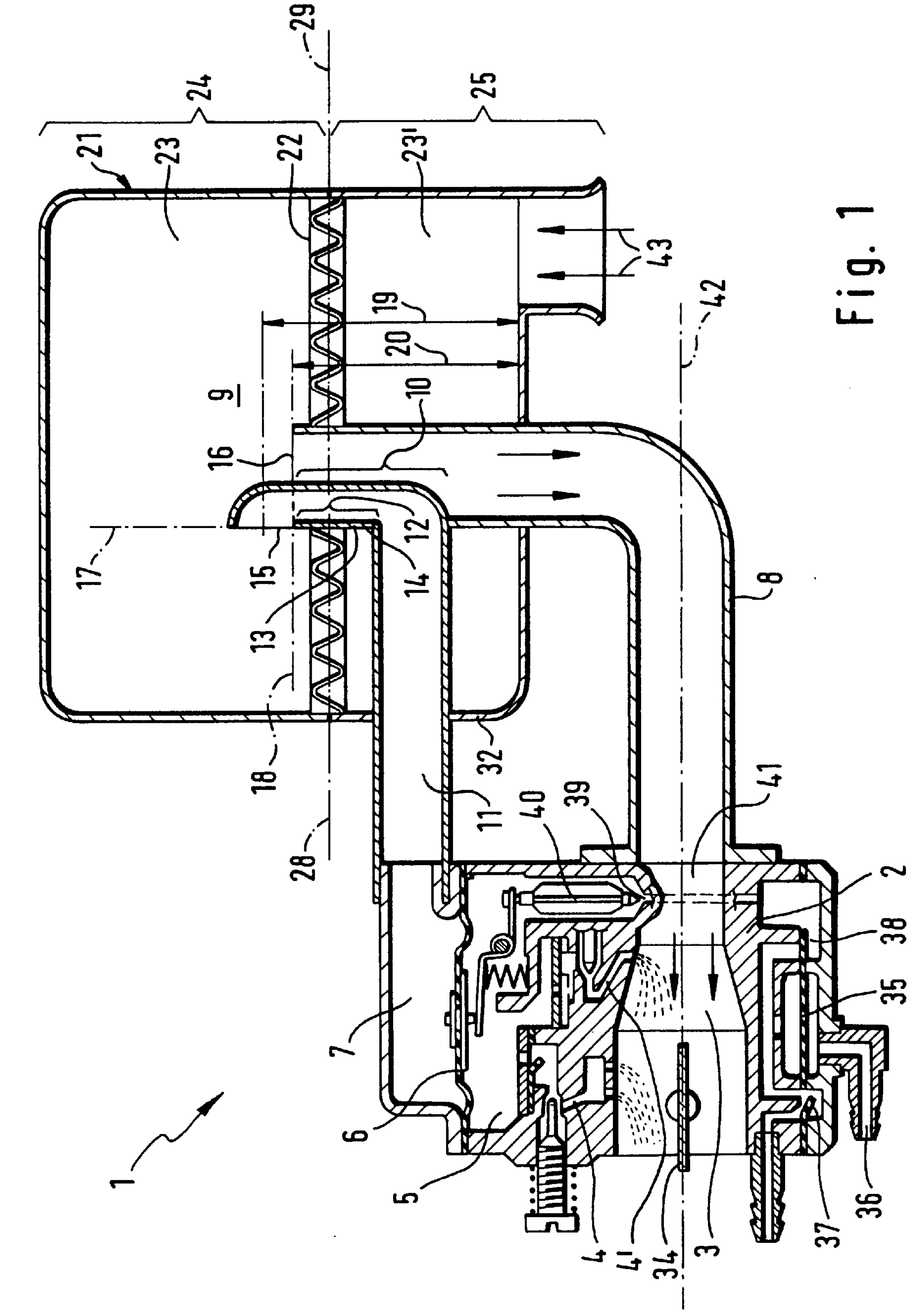
FIG. 1 is a schematic representation of an arrangement of an air filter and a membrane carburetor together with a compensation channel and connecting piece.

The arrangement shown in FIG. 1 with a membrane carburetor 1 is for an internal combustion engine in a portable handheld work apparatus such as a motor-driven chain saw, cutoff machine, brushcutter or the like. An intake channel section 3 with a throttle flap 34 is provided in the carburetor housing 2. The membrane carburetor 1 has a membrane fuel pump 35 integrated into its housing 2. The drive chamber of the fuel pump 35 is charged via a pump channel 36 with the pressure, which is present in the crankcase of the engine, and the membrane carburetor is mounted on the engine. The membrane pump 35 draws fuel via a check valve 37 from a fuel tank (not shown) and pumps this fuel via a second check valve 38 into a control chamber 5 in the carburetor housing 2 of the membrane carburetor 1. The entry channel 39 into the control chamber 5 is controlled by a control valve 40 which is controlled by the control membrane 6 delimiting the control chamber 5. From the control chamber 5, the fuel reaches the intake channel section 3 via the valve sections and the fuel conducting channels (4, 4').

A connecting piece 8 in the form of a pipe is fixed at the input 41 of the intake channel section 3. The pipe is angled at 90° to the longitudinal axis 42 of the intake channel section 3. The connecting piece 8 is guided into a housing 21 which defines a flow chamber 9 for the inducted ambient air. The filter and filter carrier 22 arranged in the housing 21 partition the clean air side 23 from the contamination side 23' of the housing. When the engine is running, the combustion air 43 flows via the air filter element of the filter carrier 22 to the clean air side 23 of the air filter and via the throttle flap 34 to the combustion chamber of the engine. Because of the generated underpressure, fuel is drawn by suction via the fuel conducting channels (4, 4') as a consequence of the configuration of the intake channel section 3 as a venturi whereby an ignition capable air/fuel mixture is introduced into the combustion chamber of the engine.

The pressure in the control chamber 5 drops because of the fuel entering into the intake channel section 3 whereby the control membrane 6 is moved into the control chamber 5 and a control valve 40 is opened via an angle-shaped lever acting at the center of the control membrane 6 so that fuel can flow in to compensate the underpressure in the control chamber 5. A compensation chamber 7 is provided in the carburetor housing 2 on the side of the control membrane 6 facing away from the control chamber 5. The compensation chamber 7 is connected via a compensation channel 11 to the clean air side 23 of the housing 21. In this way, it is achieved that, for an increased degree of contamination of the air filter 22, the underpressure, which builds up on the clean air side 23, operates on the control membrane in the compensation chamber 7 and thereby prevents too much fuel from being metered because of the high underpressure. The air/fuel mixture, which is supplied to the combustion chamber of the engine, is thereby not overenriched.

In order to configure the compensation of the membrane carburetor in a simple manner, it is provided that the compensation channel 11 and the connecting piece 8 are brought together over a distance 10 of the wall 13 of the connecting piece 8. As shown in FIG. 1, the component region 12 of the wall 13 of the connecting piece 8 forms a wall section of the compensation channel 11. The opening 15 of the compensation channel 11 determines a plane which is separate from the plane determined by the opening 16 of the connecting piece 8.

It is advantageous to arrange the openings of the compensation channel 11 and of the connecting piece 8 so that they lie facing away from each other and the planes 15 and 16 assume approximately right angles to each other. With the aid of this constructive measure, it is ensured that only static pressure is present at the opening 15 of the compensation channel 11; whereas, at the opening 16 of the connecting piece 8, a dynamic pressure is present when the engine is running. The topographical elevation 19 of the opening 15 of the compensation channel 11 in the housing 21 is thereby greater than the topographical elevation 20 of the opening 16 of the connecting piece 8.

Figure 6:
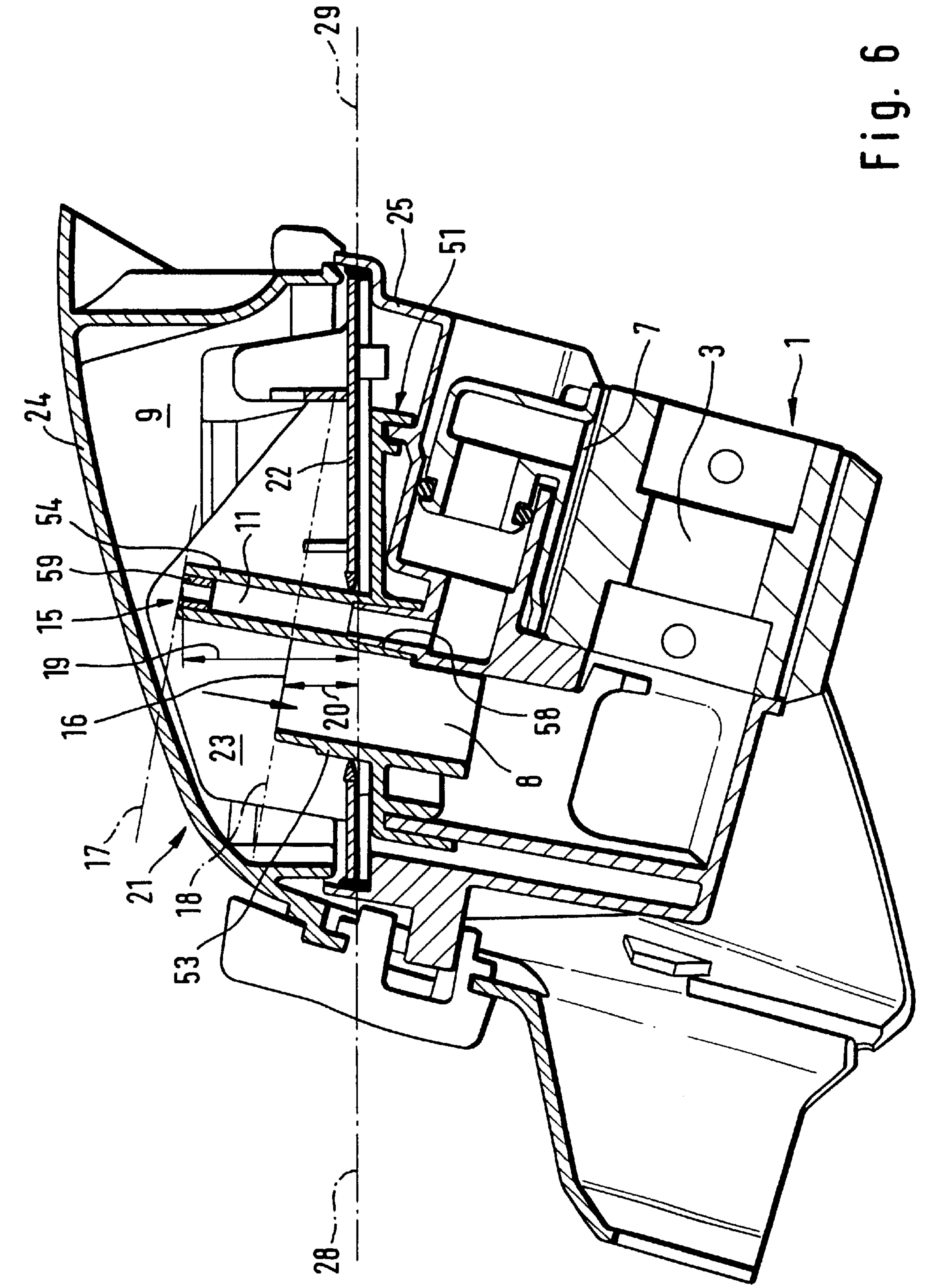
FIG. 6 is a view, in longitudinal section, of an embodiment of the arrangement of the invention of an air filter and a membrane carburetor.

As FIG. 6 shows, advantageously clear differences are present between the topographical elevations. With this spatial separation of the two openings (15, 16) it is ensured that the dynamic pressure at the opening 16 of the connecting piece 8 has no influence on the static pressure at the opening 15 of the compensation channel 11 while the engine is running. The connecting piece 8 and the compensation channel 11 extend through the filter carrier 22 as shown in FIG. 1. The filter carrier 22 partitions the housing 21 into a clear air side 23 and into a contamination side 23'. The openings 15 and 16 are arranged on the clean air side 23 of the housing 21.

Figure 2:
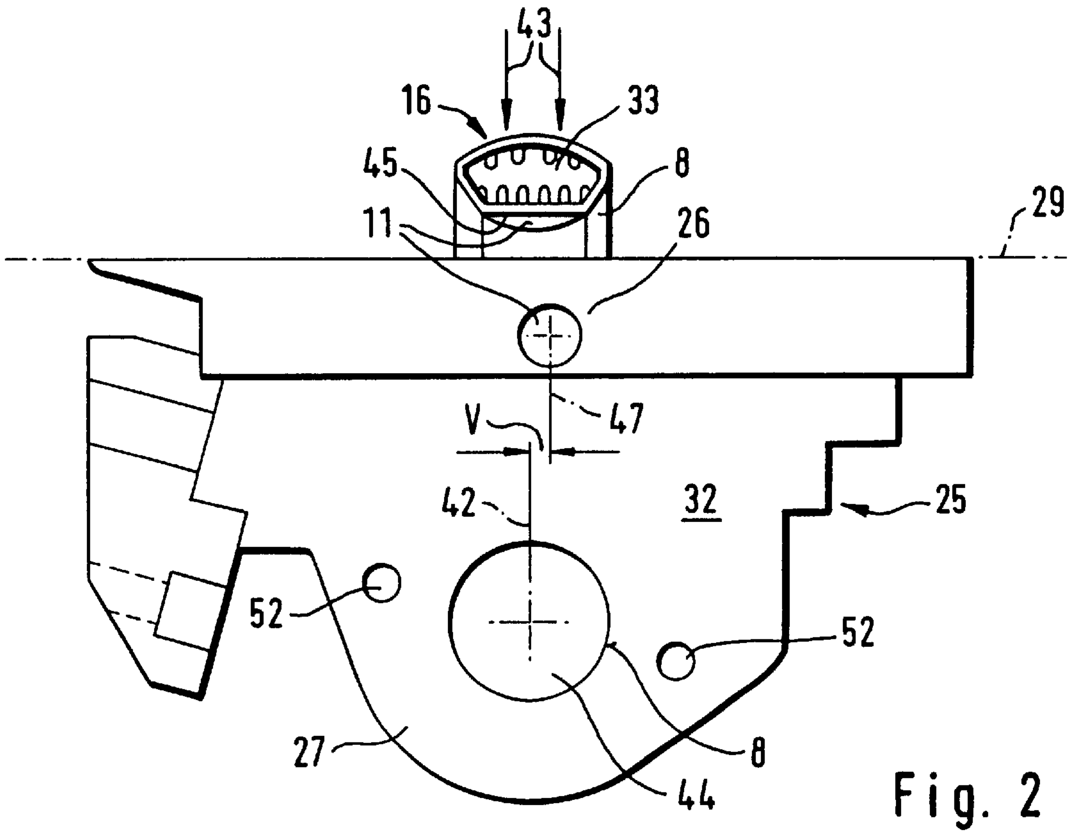
FIG. 2 is a side elevation view of a part of an air filter housing having flanges for the compensation channel and the connecting piece.

FIG. 2 shows a side view of a part 25 of the air filter housing having flanges for the compensation channel 11 and the connecting piece 8. The housing 21, which is shown in FIG. 1, defines the flow chamber 9. The housing 21 is partitioned in a plane 29 which is parallel to or identical with the center plane 28 of the air filter carrier 22 (FIG. 1). The side view toward the part 25 of the housing 21 shows in FIG. 2 that the flanges 26 and 27 on the wall 32 of the housing for the compensation channel 11 and the connecting piece 8 are formed by planar surfaces of the part 25. The diameter of the compensation channel 11 is smaller by a multiple than the diameter of the intake channel 44 of the connecting piece 8. Bores 52 are arranged on the opposite-lying sides of the intake channel 44 for fixing the membrane carburetor to the housing part 25. Threaded bolts can be guided through the bores 52.

The connecting piece 8 ends in an opening 16 above the plane 29. The opening 16 of the connecting piece 8, when viewed in section, is configured as a circular segment with a flat wall segment 45. The flat wall segment 45 defines a partition wall between the connecting piece 8 and the compensation channel 11. A flow straightener 33 for attenuating noise of the combustion air 43 is introduced into the opening 16 of the connecting piece 8. The flow straightener 33 is in the form of a lattice-like toothed plate. It can also be advantageous to configure the flow straightener 33 so that it extends over the distance 10 in FIG. 1 in the connecting piece 8 and the flow straightener 33 with its flat wall segment 45 over the distance 10 forms a wall of the compensation channel 11.

Figure 3:
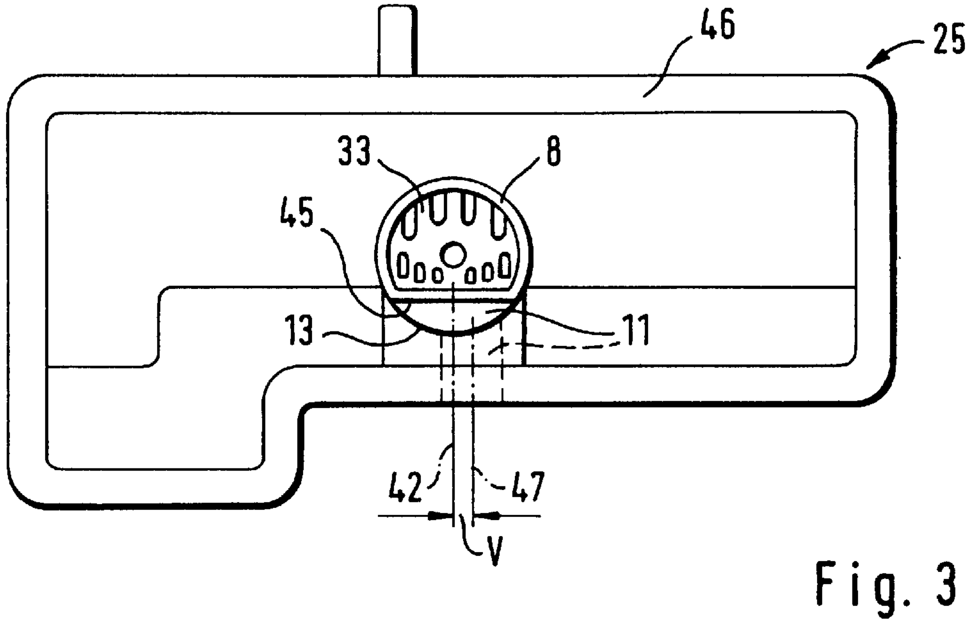
FIG. 3 is a plan view of the housing in FIG. 2.

FIG. 3 shows a plan view of the housing part 25 shown in FIG. 2. A sealing surface 46 is provided over the entire rim of the housing part 25. This sealing surface 46 serves as a sealing mount for the part 24 of the housing 21 which is shown in FIG. 1 and for accommodating the filter carrier 22. The connecting piece 8 opens approximately centrally in the center of the housing part 25 (FIG. 3). The connecting piece 8 is shown as a cylindrical pipe in the illustrated embodiment. The compensation channel 11 is guided in the connecting piece 8 with a small offset V of the longitudinal axis 47 of the compensation channel 11 to the longitudinal axis 42 of the connecting piece 8. The compensation channel 11 has a cross section corresponding to a segment of a circle over the distance 10 in FIG. 1. On the one hand, the wall 13 of the connecting piece and, on the other hand, the flat wall 45 of the flow straightener 33 define the boundary surfaces of the compensation channel 11. This constructive measure effects the condition that the compensation channel 11 and the intake channel 44 are guided together in the connecting piece 8 at least in the region whereat they pass through the filter carrier. The configuration and assembly of the air filter housing itself is simplified because the filter carrier 22 is penetrated only at one location.

Figure 4:
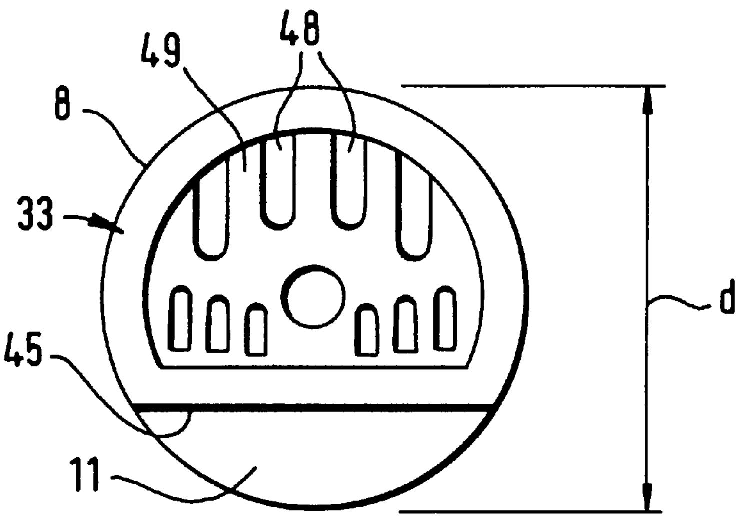
FIG. 4 is a plan view of a flow straightener for use in the opening of the connecting piece.
Figure 5:
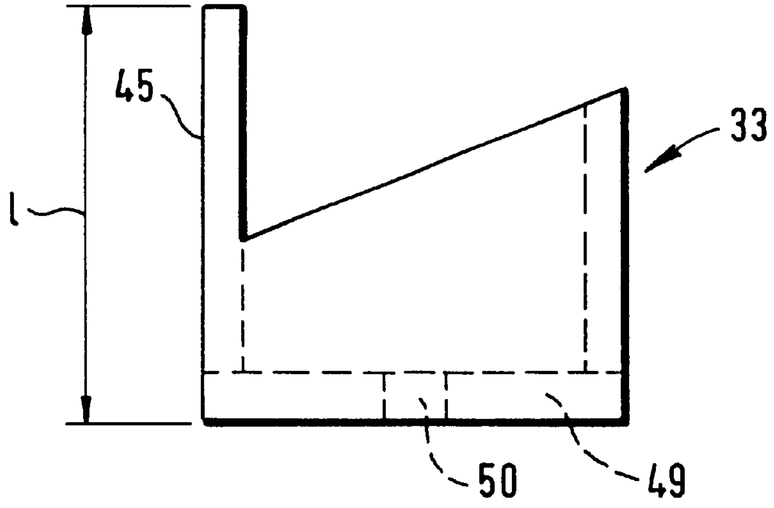
FIG. 5 is a view of the flow straightener of FIG. 4.

FIG. 4 is a plan view of a flow straightener 33 at the opening of the connecting piece 8. The flow straightener 33 has a cylindrical base body (FIG. 5). A lattice-shaped base plate 49 with cutouts 48 is mounted at one end of this cylindrical base body. The diameter (d) of the flow straightener corresponds approximately to the inner diameter of the connecting piece 8. The flow straightener 33 is seated in the connecting piece 8. The flow straightener 33 partitions the compensation channel 11 from the clear cross section of the connecting piece 8 with its flat wall 45. In this way, the flat wall 45 of the flow straightener 33 and the wall of the connecting piece 8 conjointly define the compensation channel 11 over the length L (FIG. 5).

FIG. 5 shows a longitudinal section through the flow straightener shown in FIG. 4. The flat wall 45 of the flow straightener 33 delimits a cylindrically-shaped base body of length L. One end of the cylinder segment is formed by the base plate 49 having corresponding cutouts 48 as shown in FIG. 4. The base plate 49 can have a bore 50 for fixing the flow straightener in the connecting piece 8.

FIG. 6 shows a further embodiment of an arrangement of an air filter and a membrane carburetor with compensation. The same components have the same reference numerals as in FIGS. 1 to 5. In FIG. 6, the plane 29 is coincident with the center plane 28 of the filter carrier 22. The housing 21 defines the flow space 9 and is partitioned at plane 29 into a housing part 25 facing toward the membrane carburetor 1 and a housing part 24 facing away from the membrane carburetor. An inner element 51 is mounted between the housing parts 24 and 25 for supporting the filter carrier 22. A component piece 54 of the compensation channel 11 and a component piece 53 of the connecting piece 8 are formed as one piece in the inner element 51. The component pieces have a tubular shape and define a fluid connection between the clean air side 23 of the housing 21 for the intake channel section 3 and the compensation space 7, respectively, of the membrane carburetor 1. As shown, the topographical elevation 19 of opening 15 of the compensation channel 11 is more than twice as large as the topographical elevation 20 of the opening 16 of the support piece 8. The opening 15 of the compensation channel 11 is thus mounted in the peripheral region of the flow space 9 of the housing 21. With this constructive measure, it is ensured that only static pressure is present at the opening 15 of the compensation channel 11.

Figure 7:
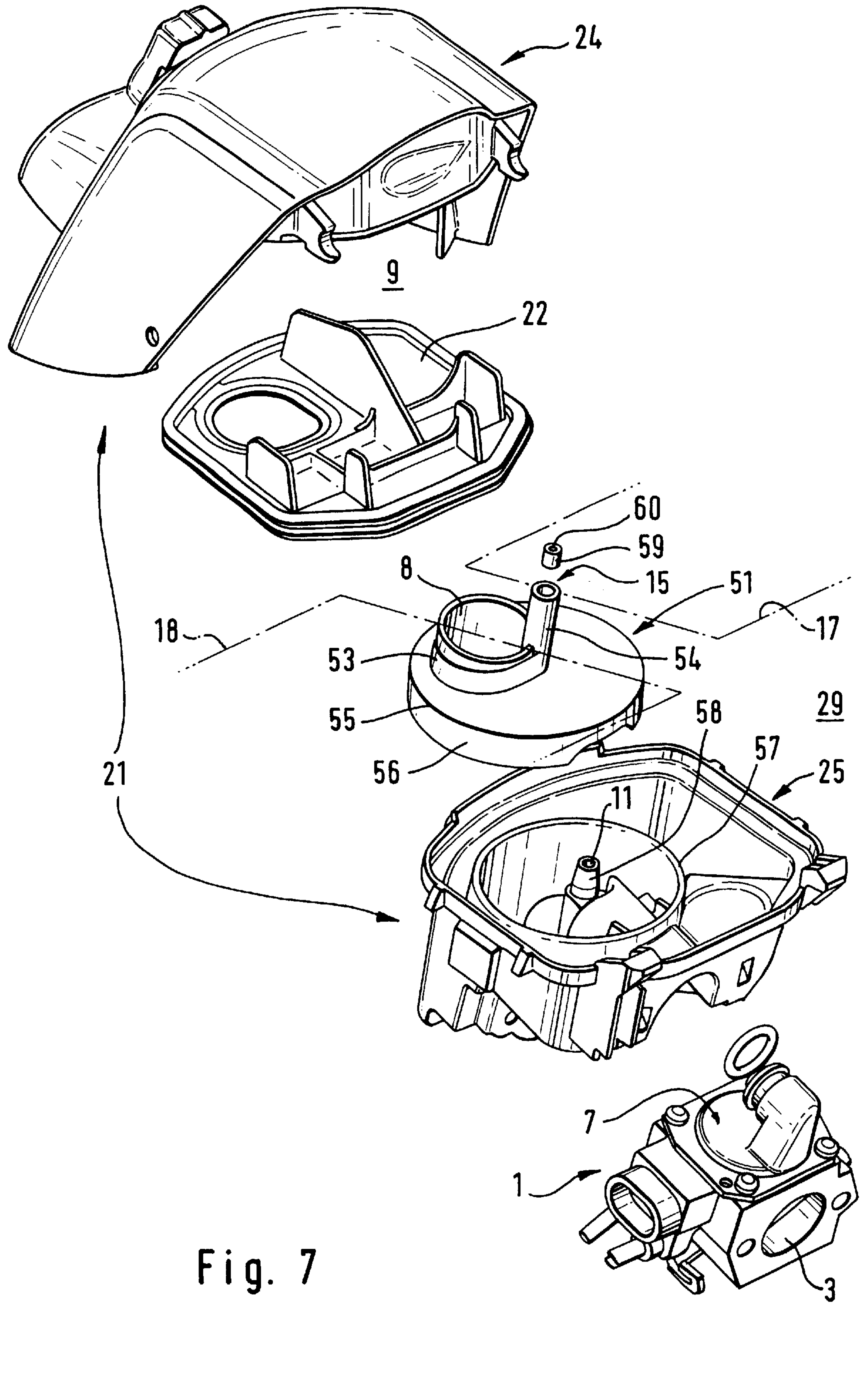
FIG. 7 is an exploded view of the arrangement of FIG. 6.

FIG. 7 shows an exploded view of the arrangement of the air filter and of the membrane carburetor 1 in FIG. 6. The housing 21 forms the flow space 9 and is partitioned into two housing halves at plane 29. The membrane carburetor 1 is mounted on the one housing half 25. In the embodiment shown, the other housing half 24 is, at the same time, a housing part, for example, of a motor-driven chain saw. A filter carrier is provided between the two housing parts (24, 25) for supporting an air filter element. The filter carrier covers the inner element 51. The inner element 51 has a circular disc-shaped base 55. A rim 56 is formed as one piece on the base 55 and has a U-shaped cross section. The rim 56 faces toward the housing part 25. A part piece or end piece 53 of the connecting piece 8 and a part piece or end piece 54 of the compensation channel 11 is formed as one piece from the base 55 of the carrier element 51. When the cylindrical rim 56, which has a U-shaped cross section, engages over the rim of a cylindrical flange 57, which is configured in the housing part 25, then the intake channel section 3 and the compensation space 7 of the membrane carburetor 1 are connected to the part piece or end pieces (53, 54), respectively, so as to permit fluid flow. For this purpose, the end piece or component piece 54 of the compensation channel 11 is expanded conically at the base 55 of the carrier element 51 and comes into seal-tight contact against a countercone 58 of the compensation channel 11 in the housing part 25. The opening 15 of the compensation channel 11 on the opposite-lying end of the conical expansion is provided with a diaphragm 59. The diaphragm 59 includes a circularly-shaped opening 16.

Figure 8:
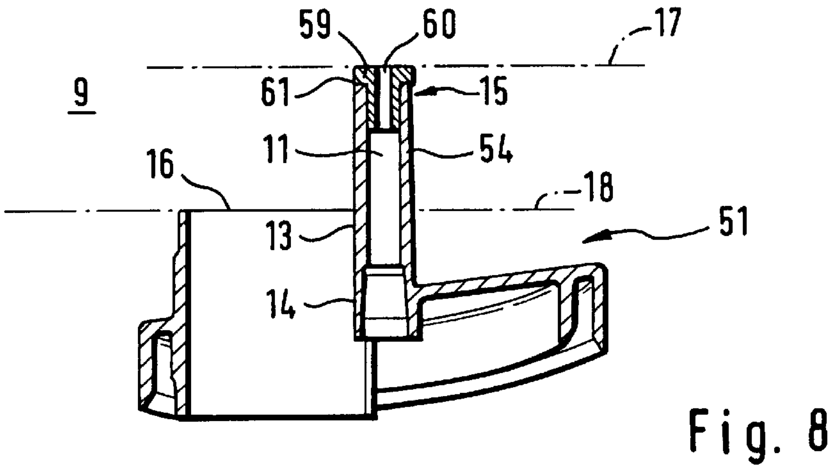
FIG. 8 is a longitudinal section taken through a housing inner element having a diaphragm in the compensation channel.
Figure 9:
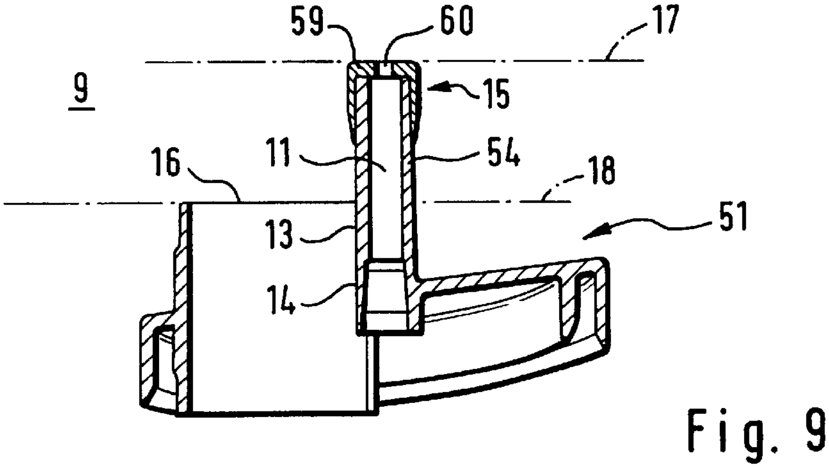
FIG. 9 is a view, in longitudinal section, taken through a housing inner element having a seated diaphragm on the compensation channel.
Figure 10:
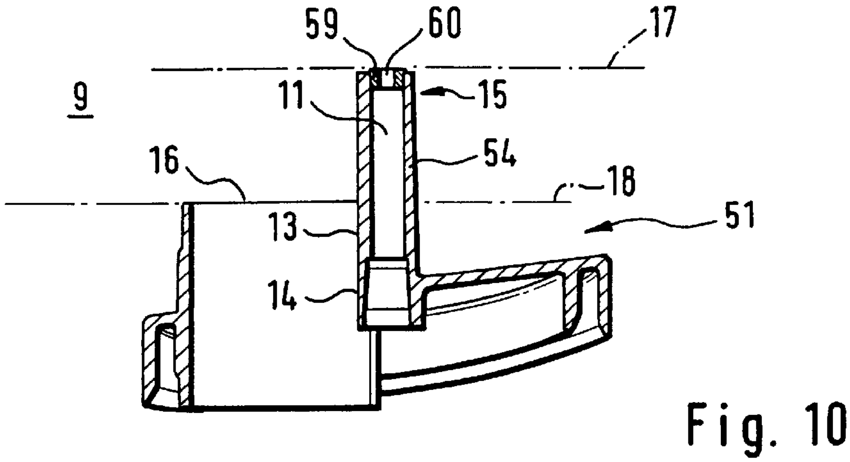
FIG. 10 is a longitudinal section through a housing inner element with a diaphragm of metal in the opening of the compensation channel.

FIGS. 8 to 10 show longitudinal sections through the carrier element 51 with differently configured diaphragms 59 at the opening 15 of the component piece 54 of the compensation channel 11. The diaphragm 59 can be pressed as a cylindrical component with a stop 61 into the opening 15 of the component piece 54 (see FIG. 8). It can be purposeful to push the diaphragm 59 as a sleeve-shaped component over the component piece 54 at the opening 15 of the compensation channel 11 (see FIG. 9). Preferably, the diaphragm 59 is made of plastic. However, if a high accuracy of the opening 60 of the diaphragm 59 is required, then the diaphragm is made of metal, for example, as a metal turned part and is fixed from the inside into the component piece 54 of the compensation channel 11 at the opening 15 thereof (see FIG. 2). The component piece 54 is configured in the interior to be conical.

Figure 11:
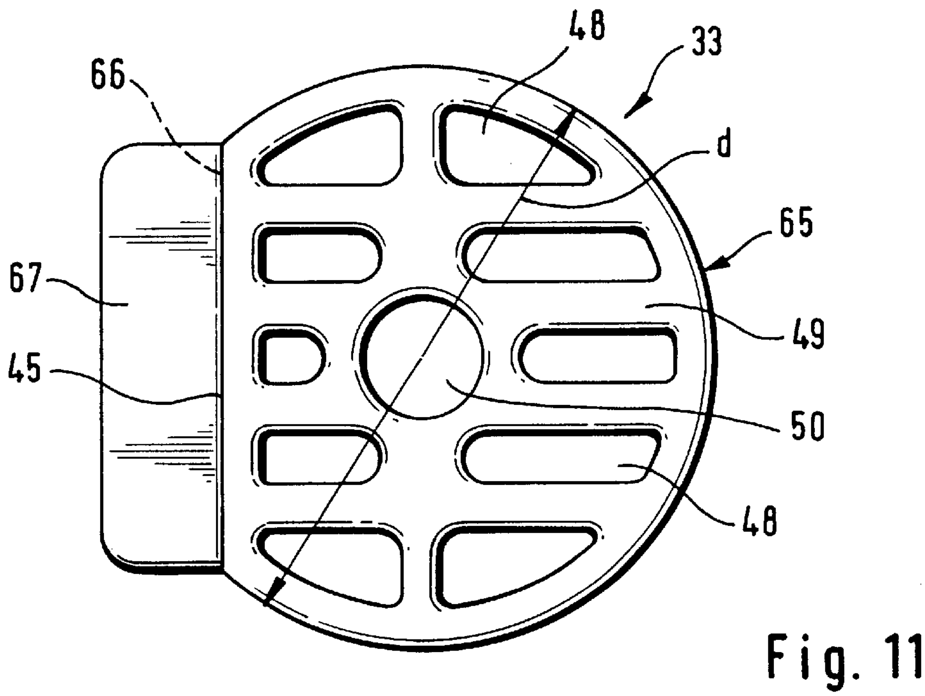
FIG. 11 is a plan view of a further flow straightener for use in the opening of the connecting piece; and, FIG. 12 is an axial section through the flow straightener of FIG. 11.
Figure 12:
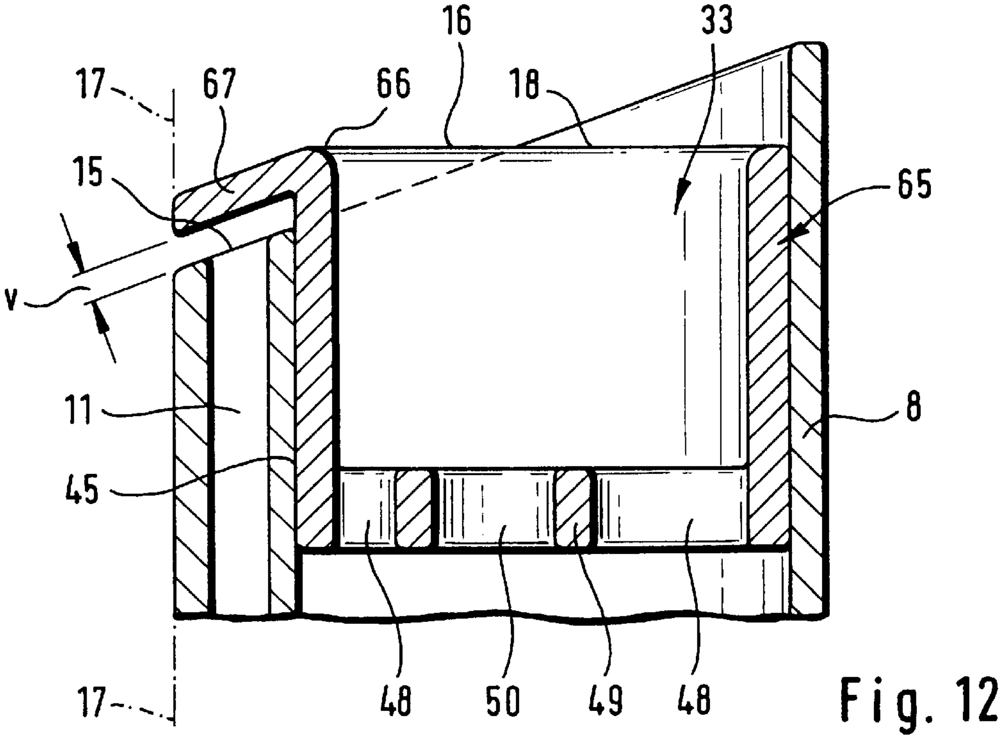

The embodiment of an intake sound silencer or flow straightener of FIGS. 11 and 12 corresponds to that of FIGS. 4 and 5 in its basic configuration. For this reason, the same parts are identified by the same reference numerals. The cylindrically-shaped base body 65 of the insert includes a flat wall 45 on its periphery which has a roof section 67 on its rim 66 facing away from the base plate 49. The roof section 67 lies outside of the base body 65 and preferably drops off slightly.

As FIG. 11 shows, the roof section 67 extends over the entire length of the rim 66 and juts out far from the wall 45 so that the opening 15 of the compensation channel 11 is essentially overlapped. The compensation channel 11 is guided in the connecting piece 8. The cover section 67 has a spacing (v) to the opening 15 so that the opening 15 can communicate with the clean air side 23 of the air filter. The roof section 67 ensures that essentially only static pressure is present at the opening 15 because the plane 18 of the air entry to the opening 15 lies transversely to the opening 16 of the connecting piece 8 and faces away from the latter.

It is understood that the foregoing description is that of the preferred embodiments of the invention and that various changes and modifications may be made thereto without departing from the spirit and scope of the invention as defined in the appended claims.

What is claimed is:

1. A combination of an air filter and a membrane carburetor, the combination comprising:

a carburetor housing defining an air intake channel through which a stream of air is drawn by suction;

said carburetor housing further defining an interior space;

a membrane partitioning said interior space into a control chamber for holding fuel and a compensation chamber;

fuel-conducting channels extending from said control chamber and opening into said air intake channel for conducting fuel from said control chamber to said air intake channel for entrainment by said stream of air;

an air filter housing defining a flow space;

a connecting pipe connecting said flow space to said air intake channel for conducting said stream of air from said flow space to said air intake channel and said connecting pipe having an opening in said flow space where said stream of air enters said connecting pipe;

a compensation channel for connecting said compensation chamber to said flow space;

said compensation channel including a channel segment within a portion of said connecting pipe and said channel segment having an opening in said flow space;

said connecting pipe having a wall and a part of said wall defining a wall of said compensation channel in the region of said channel segment; and, said openings of said connecting pipe and said channel segment of said compensation channel being disposed in said flow space in respectively different planes.

2. The combination of claim 1, wherein said opening of said connecting pipe is a first opening defining a first plane and said opening of said channel segment of said compensation channel is a second opening defining a second plane; and, said first and second planes are transverse to each other.

3. The combination of claim 2, wherein said first and second planes are approximately perpendicular to each other.

4. The combination of claim 1, wherein said opening of said connecting pipe is a first opening defining a first plane and said opening of said channel segment of said compensation channel is a second opening defining a second plane; and, said first and second planes are at different topographical elevations in said flow space.

5. The combination of claim 4, said air filter including an air filter partitioning said flow space into a clean air side and a dirt side where dirt accumulates; and, said first and second openings being disposed on said clean air side.

6. The combination of claim 5, wherein said air filter housing is configured as one piece with at least portions of said connecting pipe and said compensation channel.

7. The combination of claim 6, wherein said air filter housing is partitioned into first and second housing parts conjointly defining a partition plane; said air filter housing defining a support plane within which said air filter is supported in said air filter housing; and, said partition plane and said support plane are approximately parallel to each other.

8. The combination of claim 7, said first housing part being on said clean side and said second housing part having a wall having first and second flanges; said carburetor being mounted on said flanges with said compensation chamber being at said first flange and said air intake channel being at said second flange; and, said compensation channel opening into said compensation chamber at said first flange and said connecting pipe opening into said air intake channel at said second flange.

9. The combination of claim 5, said air filter housing including an inner element; and, a section of said connecting pipe and a section of said compensation channel being formed as one piece with said inner element.

10. The combination of claim 9, said inner element including a circularly-shaped base and a cylindrical rim extending from said base and said rim having a U-shaped configuration when viewed in section; said second housing part having a circularly-shaped flange; and, said cylindrical rim engaging over said circularly-shaped flange of said second housing part.

11. The combination of claim 10, wherein said section of said compensation channel is a first section thereof and said compensation channel includes a second section which can be connected to said first section thereof; said first section is conically expanded on said circularly-shaped base of said inner element; and, said second section is in said second housing part and has a counter cone formed thereon for coming into seal-tight engagement with said first section.

12. The combination of claim 1, further comprising a diaphragm mounted at said opening of said compensation channel is said flow space.

13. The combination of claim 12, said diaphragm being configured as a separate component.

14. The combination of claim 13, said diaphragm being made of metal.

15. The combination of claim 14, said diaphragm having an opening with a diameter of approximately 2 mm.

16. The combination of claim 1, further comprising a flow straightener mounted in said opening of said connecting pipe in said flow space.

17. The combination of claim 1, further comprising a muffler mounted in said opening of said connecting pipe in said flow space.

* * * * *